United States Patent [19]
Kistner

[11] 3,805,532
[45] Apr. 23, 1974

[54] CONSOLIDATION OF AGGREGATE MATERIAL

[75] Inventor: John F. Kistner, Stillwater, Minn.

[73] Assignee: Minnesota Mining and Manufacturing Company, St. Paul, Minn.

[22] Filed: Oct. 18, 1971

[21] Appl. No.: 190,358

Related U.S. Application Data

[63] Continuation-in-part of Ser. No. 100,378, Dec. 21, 1970.

[52] U.S. Cl. ...... 61/36 R, 260/2.5 AK, 260/2.5 AD
[51] Int. Cl. ..................... E02d 3/14, E21b 33/138
[58] Field of Search ..................... 61/36 R; 166/295; 260/2.5 A, 2.5 AG, 2.5 AK, 2.5 AD, 2.5 AW, 37 N, 38, 30.4, 57 R; 47/9

[56] References Cited
UNITED STATES PATENTS

| | | | |
|---|---|---|---|
| 3,472,644 | 10/1969 | Woodside et al. | 260/2.5 AK UX |
| 3,354,099 | 11/1967 | Stegeman | 260/2.5 AK |
| 3,538,020 | 11/1970 | Heskett et al. | 260/2.5 AK X |
| 3,367,892 | 2/1968 | Jorczak et al. | 166/295 X |
| 3,409,579 | 11/1968 | Robins | 260/30.4 R |
| 3,441,523 | 4/1969 | Dwyer et al. | 260/37 N |
| 3,401,128 | 9/1968 | Terry | 260/2.5 AK |
| 2,867,278 | 1/1959 | Mallory et al. | 166/295 |
| 3,181,611 | 5/1965 | Dollarhide | 166/295 |
| 3,719,050 | 3/1973 | Asao et al. | 61/36 R |
| 3,651,649 | 3/1972 | Najvar et al. | 61/36 R |

*Primary Examiner*—Stephen J. Novosad
*Attorney, Agent, or Firm*—Alexander, Sell, Steldt & Delahunt

[57] ABSTRACT

Aggregate material is contacted with a fluid agent comprising a hydrophilic urethane prepolymer to form a hydrophilic polyurethane-polyurea polymeric matrix which adhesively bonds the aggregate together as a resilient, integral, water-permeable mass which will sustain plant growth.

16 Claims, No Drawings

CONSOLIDATION OF AGGREGATE MATERIAL

This application is a continuation-in-part of my copending application filed Dec. 21, 1970, Ser. No. 100,378.

FIELD OF THE INVENTION

This invention relates to stabilization or consolidation of aggregate material. In another aspect, this invention relates to in situ stabilization of superficial or surface-lying aggregate material. In another aspect, this invention relates to consolidation of aggregate material for agricultural purposes to form an integral, water-permeable mass.

BACKGROUND OF THE INVENTION

Consolidation or stabilization of aggregate materials is generally undertaken to provide a tough, rigid, water-permeable consolidated mass in which some structural strength is inherent. It would be extremely desirable to provide aggregate material with a degree of consolidation while allowing the consolidated mass to retain some of the characteristics of the aggregate material, e.g., water-permeability and the ability to sustain growth of plant life. In order to accomplish this, it is apparent that the consolidated aggregate must be somewhat porous to allow the roots of plant life to obtain oxygen and water vital to sustain growth.

One area where there is a need for the benefits afforded by this invention is in the nursery practice of potting plants or seeds for germination and later transplant. Normally, pots are packed with a growing media such as black dirt, peat moss, etc., which is a time consuming and costly operation. For those nurseries which ship potted plants, substantial freight costs are incurred from the weight of the pots and potting media. Also, the consumer must remove each plant from its pot prior to transplant, again a time-consuming operation.

Another area where a need for the benefits afforded by this invention is apparent is surface area receiving heavy pedestrian traffic such as a background, backyard play area, or park. These areas usually have bare spots resulting from abrading away of the grass or other cover growth and compaction of the soil inhibiting access of air and water to the roots of said cover growth. Stabilization of such areas to wear and compaction would be desirable but of necessity would require the ability to maintain grass or other cover growth.

Hillsides or sandy slopes or other surface areas which are susceptible to erosion from the action of rain and wind, and on which cover growth is difficult to maintain provide still another area where this invention can be of benefit.

SUMMARY OF THE INVENTION

In accordance with the invention there is provided a method for consolidating aggregate materials to form a resilient, integral, water-permeable mass by contacting these materials with a fluid agent comprising a hydrophilic urethane prepolymer and curing the prepolymer with sufficient water to form a hydrophilic cellular polymer which bonds the aggregate material together.

The novel consolidated material is flexible, resilient, non-compactible, i.e., having a spongy nature, and is hydrophilic and water-permeable (i.e., water will diffuse or permeate through the consolidated mass).

Aggregate material suitable for contacting in accordance with the invention is generally solid particulate matter such as soil (e.g., black dirt, sand), and can include mineral aggregate (e.g., perlite, vermiculite), organic matter (e.g., wood pulp, ground tree bark, sawdust, ground corn cobs, wheat hulls, peat moss), or synthetic aggregate (e.g., ground glass).

The urethane prepolymer or isocyanate-terminated prepolymer useful in this invention is in general a reaction product of a material having a plurality of active hydrogen atoms, such as polyols, with an amount of organic polyisocyanate (or polyisothiocyanate) in excess of stoichiometry. The fluid agent comprising the urethane prepolymer is advantageous in that it is a one-part system, requiring no elaborate equipment for preparation or for application thereof to the aggregate material, with water being the only necessary co-reactant material.

DETAILED DESCRIPTION OF THE INVENTION

The aggregate material can in general be contacted by physically mixing the fluid agent with the aggregate material to be consolidated and then adding water to the mixture to effect the curing, i.e., polymerizing or cross-linking, reaction. For superficial or surface-lying aggregate, contacting is generally obtained by spraying the aggregate with the prepolymer fluid agent and water to provide a thin, polymeric layer overlying and adhesively bonding to the superficial aggregate.

The urethane prepolymers useful in this invention are known in the art and in general can be prepared by reacting a material having a plurality of active hydrogen atoms, such as polyols, with an amount of organic polyisocyanate (or polyisothiocyanate) in excess of stoichiometry. The equivalent ratio of isocyanate moiety, $-NCO$, to active hydrogen will be at least $2/1$, and preferably at least $2.1/1$ to $2.5/1$, and can be as high as $4/1$ or even higher.

The mechanism of the urethane prepolymer-water reaction is well known; it results in the formation of urea linkages, the water acting as a chain extender, and in the evolution of carbon dioxide which tends to foam the reaction mixture to form a cellular polymer.

One useful class of prepolymers which can be used in this invention are those which are water-miscible and can be expressed in terms of the formula

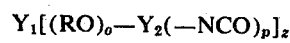

$$Y_1[(RO)_o-Y_2(-NCO)_p]_z$$

I where $Y_1$ is an active hydrogen-free residue of a compound having a plurality of active hydrogen atoms, e.g., polyhydroxy alkane or polyamino alkane such as ethylene glycol or ethylene diamine; $(RO)_o$ is a hydrophilic polyoxyalkylene chain having a plurality of oxyethylene units, such as (1) a polyoxyethylene chain (the preferred type of chain), (2) a chain having alternating blocks or backbone segments of oxyethylene and oxypropylene units, or (3) a chain of randomly distributed oxyethylene and oxypropylene units; $o$ is the number of oxyalkylene units in the polyoxyalkylene chain; $Y_2$ is a linkage or bridge the function of which is to bond the polyoxyalkylene chain to the isocyanate moieties shown in the formula; $p$ is the number of isocyanate moieties and generally will be 1 to 5, preferably 1 to 3; and $z$ is a number equal to the functionality, or number of this plurality of active-hydrogen atoms, in said compound (e.g., said polyhydroxyalkane or polyaminoalkane) which provides the residue $Y_1$ and generally $z$ will be 2 to 6. Where the prepolymer is prepared by reacting a polyol and a polyisocyanate, the polyoxyalkylene chain will be terminated with $-OC(O)NH-R'(-NCO)_p$, where $-OC(O)NH-$ is a carbamate (or urethane) group resulting from the reaction of a hydroxyl group from the polyol precursor with an isocyanate moiety from the polyisocyanate precursor, $R'$ is the residue or nucleus of the polyisocyanate precursor (which will be tolylene where the polyisocyanate precursor is tolylene diisocyanate), and $p$ is an integer equal to $q-1$, where $q$ is the number of isocyanate moieties of the polyisocyanate precursor.

The term "active hydrogen atom" as used herein refers to a hydrogen atom which reacts with the isocyanate moiety under urethane or urea bond forming conditions. The term "water-miscible" in this context means the prepolymer is dispersible (or soluble) in water.

A useful subclass of water-miscible prepolymers within the scope of formula I are those of the formula

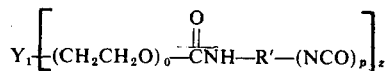
II where $Y_1$, $R'$, $o$, and $z$ are defined above, $R'$ is tolylene, $o$ is the number of oxyethylene units shown, $p$ is 1 to 3, and $z$ is equal to the functionality, e.g., 2 or 3, of said compound from which $Y_1$ is derived.

Another subclass of water-miscible prepolymers useful in the consolidation of aggregate according to this invention can be expressed by the formula

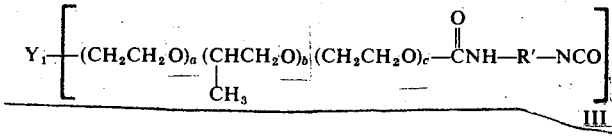
III where $Y_1$, $R'$, and $z$ are as defined above in formula II, and $a$, $b$, and $c$ are integers such that the ratio of $(a + c)/b$ is greater than 1 (and thus the prepolymers are water-miscible).

Commercially available polyol precursors useful in making the above-described water-miscible isocyanate-terminated prepolymers used in this invention are the hydrophilic poly-(oxyethylene-oxypropylene) polyols sold under the trademark "Pluronic," such as Pluronic L35, F38, and P46, and hydrophilic polyols with heteric oxyethylene-oxypropylene chains sold as "Polyol Functional Fluids," such as WL-580, WL-600, and WL-1400. Generally, the hydrophilic or water-soluble oxyethylene-containing polyols to be used will have molecular weights of at least 200 and as high as 8000; preferably they will have molecular weights of 600 to 2000. Lower molecular weight polymers, i.e., below about 600, are liquids having decreasing solubility in water. When used in this invention they provide decreased hydrophilicity and increased hardness or rigidity and friability to the consolidated aggregate mass. Conversely, higher molecular weight polymers, i.e., greater than about 2000, tend to provide solid prepolymers which require solvation when used in the invention. These also provide increased rigidity or hardness to the consolidated aggregate mass, but are extremely hydrophilic. This increased hydrophilicity causes swelling of the consolidation when saturated with water, affording a wrinkled effect. A preferred polyol (particularly when reacted with tolylene diisocyanate to form the prepolymer) is "Carbowax" 1000, which is a polyethylene glycol having a molecular weight of about 1000.

Polyisocyanates which can be used to prepare the isocyanate-terminated prepolymers used in this invention and described above include conventional aliphatic and aromatic polyisocyanates. The preferred polyisocyanates to be used will be aromatic polyisocyanates because the prepolymers made therefrom will generally react faster with water. One of the most useful polyisocyanate compounds which can be used for this purpose is tolylene diisocyanate, particularly as a blend of 80 weight percent of toluene-2,4-diisocyanate, and 20 weight percent of toluene-2,6-diisocyanate. A 65:35 blend of the 2,4- and 2,6-isomers is also useful. These polyisocyanates are commercially available under the trademark Hylene TM, Nacconate 80, and Mondur TD-80. Other useful polyisocyanate compounds which can be used are other isomers of tolylene diisocyanate, hexamethylene-1,6-diisocyanate, diphenylmethane-4,4'-diisocyanate, m- or p-phenylene diisocyanate, and 1,5-naphthalene diisocyanate. Polymeric polyisocyanates such as polymethylene polyphenyl polyisocyanates can also be used, such as those sold under the trademarks Mondur MRS and PAPI. A list of useful commercially available polyisocyanates is found in "Encyclopedia of Chemical Technology," by Kirk and Othmer, 2nd Ed., Vol. 12, pp. 46–47, Interscience Pub., (1967).

The prepolymers per se used in this invention are generally very viscous liquids and though they can be used by themselves as treating agents, it is preferred to employ the same in the form of a solution in a suitable solvent which is non-reactive with the isocyanate moiety. Thus, organic solvents, or other organic compounds which contain active hydrogen atoms are to be avoided in making up and using the prepolymer agents of this invention. Generally these solvents can be water-miscible polar organic solvents, preferably volatile at ambient conditions. Alternatively, the solvent can be a water-immiscible organic solvent which volatilizes under ambient conditions and escapes to the atmosphere from the treated mass of aggregate. Representative solvents which can be used include acetone, tetrahydrofuran, methyl ethyl ketone, methylene chloride, toluene, and methoxyethylacetate. Water itself can be used as a solvent though the resulting solution will have to be applied to the aggregate before the curing of the prepolymer takes place. By controlling the temperature of the aqueous solution, the hiatus between making up the aqueous solution and its application to the aggregate can be varied; the lower the temperature, the longer the pot-life of the solution. The concentration of the prepolymer in the solvent can vary, depending upon such factors as the viscosity desired, the technique of treating the aggregate, and the amount of materials such as grass and fertilizer contained in the solution. Generally, concentrations of 5 to 90 weight percent, will be suitable.

While effective consolidation of the aggregate can be realized without the use of a surfactant, it is preferable to include a small amount of a surfactant in the prepolymer solution. The use of a surfactant is desirable because it enhances the stability of the cell structure of the polymeric matrix during cure and insures complete wetting of the aggregate particles by the prepolymer agent. Suitable surfactants are known to the art and include polyoxyethylene derivatives of alkyl- and aryl-hydroxy and -carboxy compounds as well as sulfonated alkyl and aryl compounds, fatty acid soaps, e.g., calcium octoate, and fluorocarbon surfactants. A preferred surfactant is a polyoxyethylene derivative of fatty acid partial esters of hexatol anhydrides, available commercially from the Atlas Powder Company under the trade name designation "Tween 80." An additional commercial surfactant suitable for the use in this invention includes "Silicone Oil 120" available from Dow Chemical Co. If a surfactant is utilized, its concentration should be in the range of 1 to 2 weight percent of the prepolymer. Concentrations above this range, while not detrimental, provide no additional benefit.

The aggregate material for which the invention is useful is in general unconsolidated or loose particulate matter such as soil (e.g., black dirt, sand), including superficial soil, mineral aggregate (e.g., perlite, vermiculite), organic matter (e.g., wood pulp, ground tree bark, sawdust, ground corn cobs, wheat hulls, peat moss), synthetic aggregate (e.g., ground glass), or mixtures of the same.

The manner of contacting the aggregate material to form an integral water-permeable mass can vary depending on the intended use for the consolidated mass. For example, if the aggregate is to be consolidated in such a manner as to provide a potting compound for seeds or seedlings, the prepolymer agent is merely inter-mixed with the aggregate (which is preferably moisture-free), together with desired fertilizer, herbicides, etc., followed by mixing with water to yield a pourable slurry. This slurry can then be cast into a reuseable mold of desired configuration until cured, at which time the mold can be removed yielding a cohesive, hydrophilic, consolidated mass which retains the mold configuration.

Seeds can be inserted in the consolidated mass by making a small slit or hole in the surface of the mass with a knife, pencil, or similar object, and merely placing the seed in the opening. Alternately, the seeds can be placed on the surface of the consolidated mass and covered lightly with a layer of agricultural media such as black dirt until germination, much the same as present nursery practice. Seedlings can be inserted in a hold in the consolidated mass made by pencil or similarly shaped object.

When consolidating aggregate material for use in potting plants, etc., as just described, it is preferable to dry the aggregate prior to contacting it with the prepolymer so that it has a free-flowing consistency without clumps or lumps. This will insure adequate contact of aggregate surface area by the prepolymer agent with a minimum of agitation of the mixture prior to curing.

Where a thin layer of aggregate is desired to be consolidated in situ, as on a sandy slope or hillside to reduce erosion, a spray application of the prepolymer can be utilized. Concentration of prepolymer in a sprayable solvent composition should be on the order of about 50 to 75 percent, although lesser concentrations may be desirable when the composition includes grass seed, fertilizer, etc. in amounts which would increase the viscosity of the composition. Sprayable compositions containing 50–75 percent prepolymer are generally applied at the rate of approximately ½ to 2 gallons per 100 square feet of superficial aggregate. Spray equipment useful for applying such compositions is preferably a dual hose arrangement whereby water is delivered from one source and the prepolymer agent from a separate source, with mixing of the prepolymer and water occurring in a common spray nozzle or occurring by the individual spray streams impinging on one another. The water can also be sprayed separately after the prepolymer coating has been applied to the superficial aggregate, with satisfactory results. The polymer may be sprayed by utilizing a commercial hydroseeder or hydromulcher, followed by a water spray.

The amount of water required to effect a cure with the prepolymer should be that sufficient to yield a water-insoluble, solid, cellular polymer matrix in which the aggregate is bonded. Normally the weight ratio of water to prepolymer will be in the range of 0.1:1 to 20:1. When consolidating aggregate material to provide a potting compound, a ratio of 1:1 to 5:1 is preferred, and when consolidating superficial aggregate in situ a ratio of 3:1 to 15:1 is preferred.

The amount of prepolymer required to consolidate the aggregate material will in general be in the range of about 1 to 40 weight percent, or higher, and preferably 3 to 20 weight percent, based on the weight of the aggregate material. When utilizing the preferred polyol of about 1000 molecular weight, lower concentrations of prepolymer, i.e., below 3 weight percent of the aggregate, provide greater porosity and dimensional stability (i.e., the cured mass will not swell when saturated with water), and afford less resiliency and strength to the cured mass. Increasing concentrations tend to increase resiliency and compression and tensile strength while decreasing porosity and dimensional stability.

The prepolymer can be cured under atmospheric conditions in hot or cold weather to provide a cellular polymeric matrix which provides a flexible, non-compactible, somewhat spongy, hydrophilic, water-permeable mass of aggregate which has the appearance of the initial aggregate. Since the cured mass is water-permeable, water will diffuse through or permeate the mass. The hydrophilicity of the polymer making up the cell walls of the consolidation allows water to be retained by the mass, and the cellular nature allows "breathing" of the consolidated mass. The density of the consolidated mass is reduced from that of the unconsolidated aggregate, thereby affording a nursery man who ships potted plants or seedlings a substantial reduction in shipping costs.

Objects and advantages of this invention are illustrated in the following examples, but the various materials and amounts thereof and various other conditions and details recited therein should not be construed to unduly limit this invention.

EXAMPLE 1

One-thousand parts by weight of polyoxyethylene diol (Carbowax 1000, having a molecular weight of about 1000) was stirred and reacted with 351 parts of tolylene diisocyanate (80/20 mixture of the 2,4- and 2,6-isomers) under substantially anhydrous conditions for about 2 hrs., and the reaction mixture was allowed to stand for several days. The resulting urethane prepolymer was a viscous liquid (at 25° C.) having a structure in accordance with formula II, where $Y_1$ is the residue of ethylene glycol, $R'$ is tolylene, $o$ is about 21, $p$ is 1, and $z$ is 2.

EXAMPLE 2

A potting media was prepared by intimately mixing 20 parts of the prepolymer of Example 1 (in a 90 percent solids solution with acetone) with 291 parts of free-flowing sand (sp. gr. 1.7), adding 60 parts water to the resulting mixture and stirring vigorously with a spatula for about 20 seconds. The stirred mixture cured in about 10 minutes at room temperature to provide an integral, resilient (even when very wet), non-friable, porous, water-permeable consolidated structure.

The density of the cured system was 43 percent less than the sand itself. Germination and growth of tomatoes, cucumbers, beans, flowers (e.g., African Violets, Begonias), and jack pine seedlings progressed in the cured polymeric mass.

EXAMPLE 3

A potting media was prepared utilizing the following components:

| | Specific Gravity | Wt., gms. |
|---|---|---|
| Peat Moss — ⅓ by volume) | | |
| Vermiculite — ⅓ by volume) | 0.65 | 260 |
| Sand — ⅓ by volume) | | |
| prepolymer solution of Ex. 2 | 1.1 | 40 |
| acetone | 0.8 | 24 |
| water | 1.0 | 150 |
| After Cure | 0.37 | 474 |

The prepolymer, acetone, and water were rapidly mixed together, poured onto the physically mixed aggregate, and the entire mixture was then vigorously stirred for 30 seconds with a spatula. After 10 minutes at room temperature, the stirred mixture was cured to a porous, resilient, non-friable, water-permeable, consolidated structure. The density of the consolidated structure was 43 percent less than the initial aggregate material mixture. This consoldiated structure is useful for growing the same products illustrated in Example 1.

EXAMPLE 4

A 30 sq. ft. plot of superficial soil was raked and smoothed and then sprinkled with one gallon of a 33 wt. percent acetone solution of the prepolymer of Example 1. Immediately thereafter, grass seed was uniformly spread over the treated soil in the amount of 2–5 pounds/1000 ft$^2$ and raked into the treated soil to a depth of 1–2. The treated soil was immediately watered lightly. The prepolymer consolidated the soil in about 10–20 min. to a resilient mass which readily soaked up water. A laboratory test, run in a similar manner, using rye grass seed, resulted in a higher rate of germination of the seed than was obtained with seed planted in untreated soil.

EXAMPLE 5

A sandy hillside was sprayed with a 50 weight percent acetone solution of the prepolymer of Example 1 utilizing low pressure spray equipment to provide 36 gm. of active prepolymer per square foot of contact surface. This area was then raked with a common garden rake and sprinkled with grass seed. Approximately 20 minutes later the contacted area was sprayed with water from a common garden hose until the area was saturated and runoff began to occur. Within 15 to 20 minutes the prepolymer cured and consolidated the soil to a resilient, water-permeable mass. A control area adjacent to the treated area was raked and seeded at the same time. Eleven months later the treated area showed no signs of erosion, and the grass seed germinated. The control area has rivulets or channels 1 ½ to 2 inches deep through it due to erosion, and most of the grass seed was washed away.

EXAMPLE 6

An aluminum tray, approximately 9 × 13 inches and one inch deep was filled with sand. 20 grams of the prepolymer solution described in Example 2 was mixed with 250 ml. water and immediately sprinkled evenly over the surface of the sand. After 15 minutes, the tray was tilted at a 45° angle and flushed with a strong stream of water from a water faucet. No sand was washed away from the tray by the water. A resilient skin bonding the sand particles into an integral covering prevented erosion of the sand in the tray. The same results were obtained when 20 g. of the prepolymer solution was mixed with 60 ml., 100 ml., 150 ml., 200 ml., and 300 ml., of water.

Modifications and variations of this invention will become apparent to those skilled in the art without departing from the scope of this invention, and this invention is not to be unduly limited to the illustrative embodiments set forth herein.

What is claimed is:

1. A method for consolidating aggregate material to form a resilient, integral, water-permeable mass which comprises contacting said aggregate material with a fluid agent comprising a hydrophilic urethane prepolymer having a plurality of oxyethylene units in its polymer backbone, and curing said prepolymer with sufficient water to form a hydrophilic cellular polymer which bonds said aggregate together, said prepolymer being used in an amount sufficient, when cured, to bond said aggregate to form said water-permeable mass.

2. The method according to claim 1, wherein said aggregate material comprises superficial soil.

3. The method according to claim 1, wherein said aggregate material and said prepolymer are physically intermixed before being contacted with water.

4. The method according to claim 1, wherein said prepolymer and water are sprayed onto said aggregate material, followed by curing of said prepolymer.

5. The method according to claim 1, wherein said fluid agent further comprises a minor amount of a surfactant.

6. The method according to claim 1, wherein said prepolymer has the formula

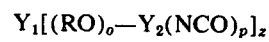

where $Y_1$ is an active hydrogen-free residue of a compound having a plurality of active hydrogen atoms, $(RO)_o$ is a hydrophilic polyoxyalkylene chain having a plurality of oxyethylene units, $o$ is the number of oxyalkylene units in said chain, $Y_2$ is an organic linkage bonding said chain to the isocyanate moieties shown in said formula, $p$ is 1 to 5, and $z$ is the number of said active hydrogen atoms in said compound from which $Y_2$ is derived.

7. A method for consolidating aggregate material to form a resilient, integral, water-permeable mass which comprises contacting said aggregate material with a fluid agent comprising a hydrophilic urethane prepolymer and curing said prepolymer with sufficient water to form a hydrophilic cellular polymer which bonds said aggregate together, said prepolymer having the formula

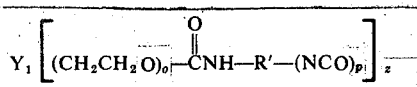

where $Y_1$ is an active hydrogen atom-free residue of a compound having a plurality of active hydrogen atoms, R' is an aromatic nucleus derived from an organic polyisocyanate, $o$ is the number of oxyethylene units shown in said formula, $p$ is 1 to 3, and $z$ is 2 to 3, said prepolymer being used in an amount sufficient, when cured, to bond said aggregate to form said water-permeable mass.

8. The method according to claim 7 wherein said compound from which $Y_1$ is derived is ethylene glycol, R' is tolylene, $o$ is about 21, $p$ is 1, and $z$ is 2.

9. The method according to claim 7, wherein said aggregate material and said prepolymer are physically intermixed before being contacted with water.

10. The method according to claim 7, wherein said prepolymer and water are sprayed onto said aggregate material, followed by curing of said prepolymer.

11. The method according to claim 7, wherein said fluid agent further comprises a minor amount of a surfactant.

12. A resilient, integral, water-permeable mass comprising aggregate material bonded in a water-insoluble cellular, hydrophilic polyurethane-polyurea polymer matrix, said polymer being derived from a hydrophilic urethane prepolymer having a plurality of oxyethylene units in its polymer backbone.

13. A resilient mass in accordance with claim 12, wherein said aggregate is superficial soil.

14. A resilient, integral, water-permeable mass comprising aggregate material bonded in a water-insoluble, cellular, hydrophilic polyurethane-polyurea polymer matrix, said polymer being derived from a prepolymer of the formula

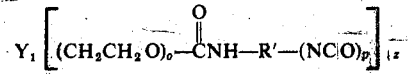

where $Y_1$ is an active hydrogen atom-free residue of a compound having a plurality of active hydrogen atoms, R' is an aromatic nucleus derived from an organic polyisocyanate, $o$ is the numer of oxyethylene units shown in said formula, $p$ is 1 to 3, and $z$ is 2 to 3.

15. A resilient mass according to claim 14 wherein said compound from which $Y_1$ is derived is ethylene glycol, R' is tolylene, $o$ is about 21, $p$ is 1, and $z$ is 2.

16. A resilient mass in accordance with claim 14, wherein said aggregate is wood pulp, ground tree bark, sawdust, ground corn cobs, wheat hulls, peat moss, or other organic matter.

* * * * *

UNITED STATES PATENT OFFICE
CERTIFICATE OF CORRECTION

PATENT NO. : 3,805,532
DATED : April 23, 1974
INVENTOR(S) : JOHN F. KISTNER

It is certified that error appears in the above—identified patent and that said Letters Patent are hereby corrected as shown below:

Col. 1, line 41, "background" should read -- playground -- .

Col. 5, line 45, "hold" should read -- hole -- .

Col. 7, line 47, "1-2." should read -- 1-2 inches. -- .

Col. 8, line 3, "has" should read -- had -- .

Signed and Sealed this ninth Day of December 1975

[SEAL]

Attest:

RUTH C. MASON
Attesting Officer

C. MARSHALL DANN
Commissioner of Patents and Trademarks

REEXAMINATION CERTIFICATE (367th)

United States Patent [19]

Kistner

[11] B1 3,805,532

[45] Certificate Issued Jul. 16, 1985

[54] CONSOLIDATION OF AGGREGATE MATERIAL

[75] Inventor: John F. Kistner, Stillwater, Minn.

[73] Assignee: Minnesota Mining and Manufacturing Company, St. Paul, Minn.

Reexamination Request:
No. 90/000,598, Jul. 30, 1984

Reexamination Certificate for:
Patent No.: 3,805,532
Issued: Apr. 23, 1974
Appl. No.: 190,358
Filed: Oct. 18, 1971

Certificate of Correction issued Dec. 9, 1975.

Related U.S. Application Data

[63] Continuation-in-part of Ser. No. 100,378, Dec. 21, 1970.

[51] Int. Cl.³ .................. C09K 17/00; E21B 33/138; E02D 3/12

[52] U.S. Cl. .................. 405/264; 521/100; 523/132

[58] Field of Search .............. 166/295; 405/264; 71/1, 71/28; 523/131, 132; 521/100, 116

[56] References Cited

U.S. PATENT DOCUMENTS

| | | | |
|---|---|---|---|
| 3,354,099 | 11/1967 | Stegeman | 521/100 |
| 3,367,892 | 2/1968 | Jorczak et al. | 166/295 X |
| 3,373,009 | 3/1968 | Pruitt et al. | 71/28 |
| 3,409,579 | 11/1968 | Robins | 523/143 |
| 3,463,745 | 8/1969 | Hoffrichter et al. | 521/116 |
| 3,472,644 | 10/1969 | Woodside et al. | 71/1 |
| 3,538,020 | 11/1970 | Heskett et al. | 210/446 |
| 3,706,678 | 12/1972 | Dietrich et al. | 521/162 |
| 3,719,050 | 3/1973 | Asao et al. | 405/264 |

*Primary Examiner*—Stephen J. Novosad

[57] ABSTRACT

Aggregate material is contacted with a fluid agent comprising a hydrophilic urethane prepolymer to form a hydrophilic polyurethane-polyurea polymeric matrix which adhesively bonds the aggregate together as a resilient, integral, water-permeable mass which will sustain plant growth.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9–12 and 16 are cancelled.

Claims 2–7, 13, and 14 are determined to be patentable as amended.

Claims 8 and 15, dependent on an amended claim, are determined to be patentable.

New claims 17–21 are added and determined to be patentable.

2. The method according to claim [1] *18*, wherein said aggregate material comprises superficial soil.

3. The method according to claim [1] *18*, wherein said aggregate material and said prepolymer are physically intermixed before being contacted with water.

4. The method according to claim [1] *18*, wherein said prepolymer and water are sprayed onto said aggregate material, followed by curing of said prepolymer.

5. The method according to claim [1] *18*, wherein said fluid agent further comprises a minor amount of a surfactant.

6. The method according to claim [1] *8*, wherein said prepolymer has the formula $$Y_1[(RO)_o-Y_2(NCO)_p]_z$$

where $Y_1$ is an active hydrogen-free residue of a compound having a plurality of active hydrogen atoms, $(RO)_o$ is a hydrophilic polyoxyalkylene chain having a plurality of oxyethylene units, o is the number of oxyalkylene units in said chain, $Y_2$ is an organic linkage bonding said chain to the isocyanate moieties shown in said formula, p is 1 to 5, and z is the number of said active hydrogen atoms in said compound from which $Y_2$ is derived.

7. A method [for consolidating aggregate material to form a resilient, integral, water-permeable mass which comprises contacting said aggregate material with a fluid agent comprising a hydrophilic urethane prepolymer and curing said prepolymer with sufficient water to form a hydrophilic cellular polymer which bonds said aggregate together,] *according to claim 18, wherein said prepolymer having the formula*

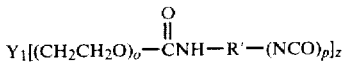

where $Y_1$ is an active hydrogen atom-free residue of a compound having a plurality of active hydrogen atoms, R' is an aromatic nucleus derived from an organic polyisocyanate, o is the number of oxyethylene units shown in said formula, p is 1 to 3, and z is 2 to 3 [; said prepolymer being used in an amount sufficient, when cured, to bond said aggregate to form said water-premeable mass].

13. A [resilient mass] *potting media* in accordance with claim [12] *19*, wherein said aggregate is superficial soil.

14. A [resilient, integral water-permeable mass comprising aggregate material bonded in a water-insoluble, cellular, hydrophilic polyurethane-polyurea polymer matrix] *potting media of claim 19*, said polymer being derived from a prepolymer of the formula

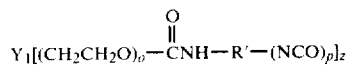

where $Y_1$ is an active hydrogen atom-free residue of a compound having a plurality of active hydrogen atoms, R' is an aromatic nucleaus derived from an organic polyisocyanate, o is the number of oxyethylene units shown in said formula, p is 1 to 3, and z is 2 to 3.

*17. A method for forming potting media comprising mixing aggregate material with a fluid agent comprising a hydrophilic urethane prepolymer having a plurality of oxyethylene units in its polymer backbone and water to form a slurry, the weight ratio of water to prepolymer being in the range of 1:1 to 5:1 and said prepolymer comprising about 1 to 40 weight percent based on the weight of the aggregate material, pouring said slurry into a mold and allowing said prepolymer to cure to form a porous cellular, cohesive resilient, integral, water-permeable, hydrophilic, flexible, spongy, breathable, cast potting media for supporting plant growth.*

*18. The method according to claim 17, wherein said prepolymer comprises 3 to 20 weight percent, based on the weight of the aggregate material.*

*19. A resilient, integral, water-permeable, hydrophilic, breathable potting media comprising aggregate material bonded in a water-insoluble, cellular, hydrophilic polyurethane-polyurea polymer matrix, said polymer matrix being the reaction product of a hydrophilic urethane prepolymer having a plurality of oxyethylene units in its polymer backbone and water, the weight ratio of water to prepolymer forming the reaction product being 1:1 to 5:1 and the amount of prepolymer used to form the polymer matrix being about 1 to 40 weight percent based on the weight of the aggregate material in the potting media.*

*20. The potting media of claim 19 wherein said aggregate is selected from soil, perlite, vermiculite, wood pulp, ground tree bark, sawdust, ground corn cobs, wheat hulls, peat moss, and other organic matter.*

*21. The potting media according to claim 19, wherein the amount of prepolymer used to form the polymer matrix is 3 to 20 weight percent, based on the weight of the aggregate material.*

* * * * *